United States Patent Office 3,304,146
Patented Feb. 14, 1967

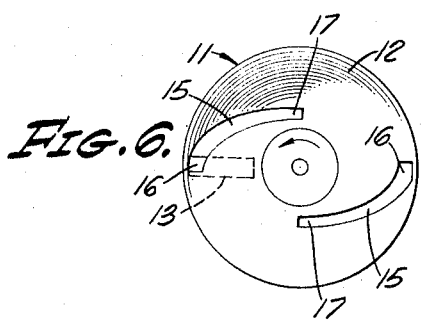
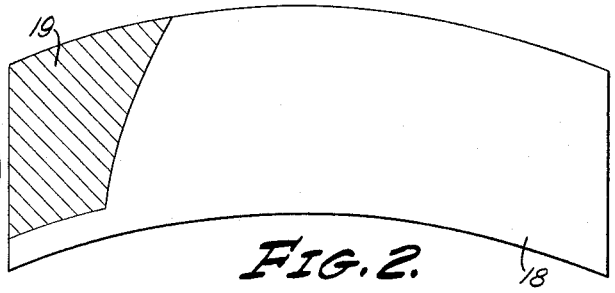
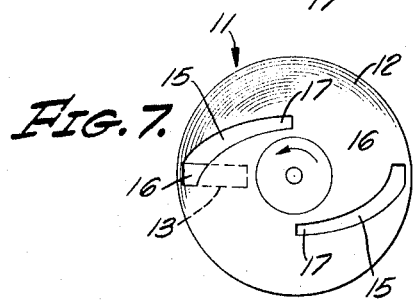
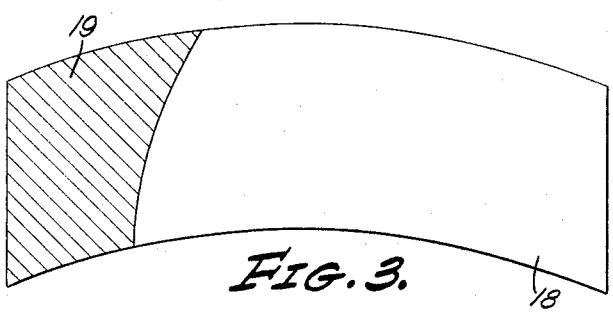
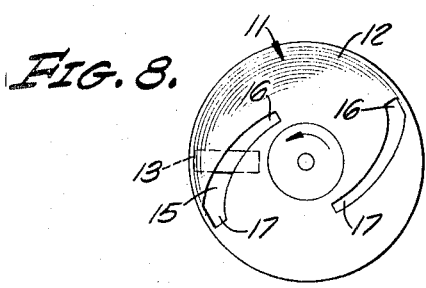
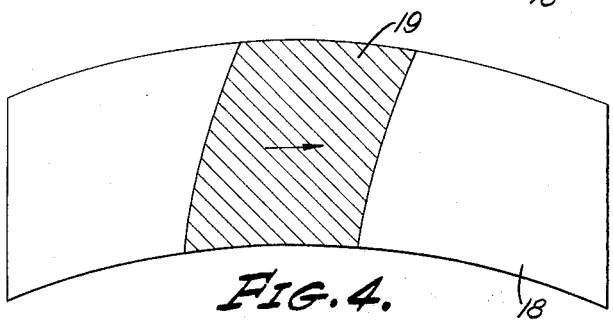
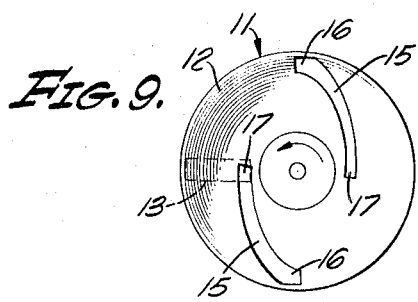
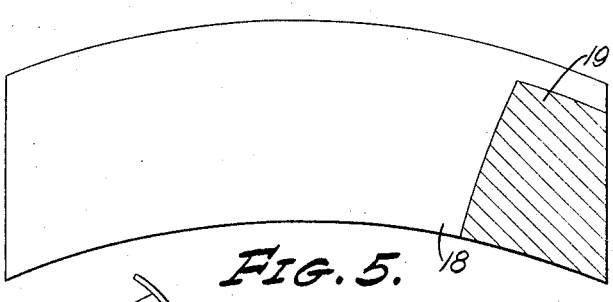
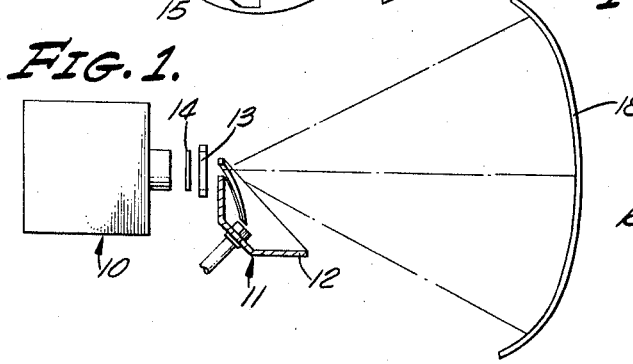

3,304,146
APPARATUS FOR PROJECTING
MOTION PICTURES
Robert E. Gottschalk, Los Angeles, Calif., assignor to Panavision Incorporated, Los Angeles, Calif., a corporation of California
Filed Aug. 28, 1964, Ser. No. 392,719
1 Claim. (Cl. 352—208)

This invention relates to motion-picture projection systems and is particularly directed to a method for avoiding objectionable reflection of light on a curved viewing screen, as well as to apparatus for carrying out such method.

Motion-picture projection systems for theaters commonly employ a viewing screen which is not flat, but which is curved, partciularly at both ends. The purpose of such a viewing screen is to provide a wide-angle picture in which adequate light is reflected to the viewer, as well as to produce the illusion that the viewer is present in the scene depicted on the screen. A difficulty arises in this conventional system in that light from the left end of the curved screen is reflected to the right end, and vice versa. The reflected light from one side of the screen to the other side reduces contrast between light and dark parts of the scene to an objectionable degree. One attempted solution has been to construct the viewing screen of lenticular elements to minimize the reflection of light from one end of the screen to the other, but this has proved to be expensive and not very satisfactory.

In accordance with this invention, the objectionable reduction in contrast between light and dark parts of the scene is minimized by avoiding simultaneous projection of light to both ends of the curved screen. Instead of simultaneously illuminating the full length of the screen for each frame of the film strip being projected, the screen is sequentially illuminated by a band of light which travels from left to right, or from right to left for each film frame, so that one end of the screen area is dark by the time the other end is illuminated. One of the opposite ends of the curved screen is dark at any given instant.

A preferred form of apparatus for carrying out the method is shown in the accompanying drawings. In these drawings:

FIGURE 1 is a side elevation of a conventional motion-picture projector having a rotary shutter.

FIGURES 2, 3, 4, and 5 are diagrams showing how a band of light moves from left to right across the viewing screen as the rotary shutter turns.

FIGURES 6, 7, 8, and 9 show the corresponding positions of the rotary shutter corresponding to FIGURES 2, 3, 4, and 5, respectively.

Referring to the drawings, the projector generally designated 10 is of conventional type and has a rotary shaft which carries a shutter 11. This shutter may be constructed in the form of a flat disk, or, as shown in the drawings, may have a conical portion 12, which passes in front of the stationary aperture 13. The film 14 is advanced step-by-step so that the shutter 11 turns through one revolution for each frame of the film 14. The conical portion 12 of the rotary shutter 11 is provided with arcuate slots 15, which spiral from the periphery toward the hub. The leading end 16 of each slot 15 first passes over the left end of the aperture 13 and then, as the shutter continues to turn, the central portion of the aperture 13 is exposed. Finally, the trailing end 17 of the aperture 15 exposes the right-hand end portion of the aperture 13. The effect on the curved viewing screen 18 is to cause a band of light 19 to first illuminate the left-hand end of the screen and then to travel or sweep toward the right, as shown sequentially in FIGURES 2, 3, 4, and 5. This band of light 19 illuminates only a portion of the viewing screen 18 at any one instant. Consequently, when the band of light is directed against one end of the curved screen, the other end is dark. Reflected light from one end of the screen to the other therefore does not act to diminish contrast between light and dark portions the the scene.

While two spiral slots 15 have been shown in the drawings, it is to be understood that only one may be used, if desired, or it may be desired to employ more than two. It is known that illuminating the same film frame for two separate short time intervals is superior to illuminating the frame for one longer time interval, because of the objectionable sensation of "flicker."

Having fully described my invention, it is to be understood that I am not to be limited to the details herein set forth, but that my invention is of the full scope of the appended claim.

I claim:
A rotary shutter for use with a motion picture projector in which planar film frames are advanced intermittently past a stationary beam of light to project an image beam of images on said frames toward a curved viewing screen, the improvement comprising: shutter means for blocking all but a limited substantially vertical portion of said image beam and being movable to continuously scan said limited portion of said image beam in a moving band across said curved screen to prevent the image beam from said frame from impinging simultaneously on both ends of said curved screen, said shutter means comprising a substantially opaque member having at least one slot opening therein which extends in generally spiral form from the periphery toward the hub of said member, said slot being smaller than the width of a frame.

References Cited by the Examiner

UNITED STATES PATENTS

| | | | |
|---|---|---|---|
| 1,375,375 | 4/1921 | Frist | 352—210 |
| 2,044,478 | 6/1936 | Leventhal | 352—105 |
| 2,073,798 | 3/1937 | Hillman | 352—45 |
| 2,392,440 | 1/1946 | Waller et al. | 352—40 |
| 2,413,269 | 12/1946 | Waller et al. | 352—40 |
| 2,438,137 | 3/1948 | Waller et al. | 352—69 |
| 2,926,561 | 1/1960 | Keeble | 352—69 |
| 2,938,425 | 5/1960 | Lopez-Henriquez | 352—60 |

JULIA E. COINER, *Primary Examiner.*